(12) United States Patent
de Andrade Alves et al.

(10) Patent No.: US 12,317,886 B2
(45) Date of Patent: Jun. 3, 2025

(54) HYDRAULIC SUSPENSION FOR BOOM ASSEMBLY OF A WORK VEHICLE

(71) Applicant: CNH Industrial America LLC, New Holland, PA (US)

(72) Inventors: Paulo José de Andrade Alves, Piracicaba (BR); Thiago Kato Perez, Piracicaba (BR); Mauro de Azevedo Barretto, Cotia (BR); Miguel Ballestero Neto, Piracicaba (BR); Diego Doin Hoepfner, Curitiba (BR); Carlos Henrique Spiacci Correia, Santa Barbara d'Oeste (BR)

( * ) Notice: Subject to any disclaimer, the term of this patent is extended or adjusted under 35 U.S.C. 154(b) by 569 days.

(21) Appl. No.: 17/690,792

(22) Filed: Mar. 9, 2022

(65) Prior Publication Data
US 2022/0287289 A1    Sep. 15, 2022

(30) Foreign Application Priority Data
Mar. 12, 2021 (BR) .......................... 1020210046996

(51) Int. Cl.
*A01M 7/00* (2006.01)
*A01C 23/00* (2006.01)

(52) U.S. Cl.
CPC ......... *A01M 7/0057* (2013.01); *A01C 23/008* (2013.01); *A01M 7/0075* (2013.01); *A01M 7/0089* (2013.01)

(58) Field of Classification Search
CPC .............. A01M 7/0057; A01M 7/0075; A01M 7/0089; A01C 23/008

USPC ......................................... 239/159
See application file for complete search history.

(56) References Cited

U.S. PATENT DOCUMENTS

| 4,595,140 | A | * | 6/1986 | Harden | A01M 7/0075 239/167 |
| 4,643,358 | A | * | 2/1987 | Jackson | A01M 7/0075 172/463 |
| 5,486,084 | A | * | 1/1996 | Pitman | E02F 3/384 212/300 |
| 5,957,383 | A | * | 9/1999 | Benest | A01B 73/04 239/168 |
| 5,988,528 | A | * | 11/1999 | Krohn | A01M 7/0075 239/168 |

(Continued)

FOREIGN PATENT DOCUMENTS

FR     2996412      4/2014
WO     2017029349   2/2017

*Primary Examiner* — Chee-Chong Lee
(74) *Attorney, Agent, or Firm* — Rebecca Henkel; Rickard K. DeMille; Peter K. Zacharias

(57) ABSTRACT

A boom assembly is provided herein that includes a mast configured to couple with a work vehicle. A frame supports first and second boom arms extending from opposing side portions of the frame. Each of the first and second boom arms are configured to move between a folded position and an unfolded position. A hydraulic suspension is operably coupled to the frame and the mast. The hydraulic suspension includes first and second actuators configured to mechanically interconnect opposing side portions of the frame to the mast. The hydraulic suspension further includes a damping assembly positioned in fluid communication with the first and second actuators and can provide various damping levels to the boom assembly.

17 Claims, 8 Drawing Sheets

(56) References Cited

U.S. PATENT DOCUMENTS

| | | | |
|---|---|---|---|
| 7,431,221 B2* | 10/2008 | Thompson | A01B 73/065 239/168 |
| 7,729,832 B2* | 6/2010 | Benckert | E04G 21/0463 222/533 |
| 7,878,422 B2 | 2/2011 | Heiniger et al. | |
| 7,913,930 B2* | 3/2011 | Theeuwen | A01C 23/008 239/164 |
| 9,763,437 B2 | 9/2017 | Schnaider et al. | |
| 10,178,863 B2 | 1/2019 | Schnaider et al. | |
| 10,343,180 B2 | 7/2019 | Rouyer et al. | |
| 2014/0196996 A1 | 7/2014 | Ito et al. | |
| 2017/0027152 A1* | 2/2017 | Hiddema | A01M 7/0075 |

* cited by examiner

HYDRAULIC SUSPENSION FOR BOOM ASSEMBLY OF A WORK VEHICLE

CROSS-REFERENCE TO RELATED APPLICATION

This application claims priority from and the benefit of Brazilian Application No. BR 10 2021 004699 6, entitled "Hydraulic Suspension for Boom Assembly of a Work Vehicle", filed Mar. 12, 2021, which is hereby incorporated by reference in its entirety.

FIELD OF THE INVENTION

The present subject matter relates generally to agricultural applicators, and more particularly, to a boom assembly for an agricultural applicator having a hydraulic suspension operably coupled with a frame and a mast of the boom assembly.

BACKGROUND OF THE INVENTION

Various types of work vehicles utilize applicators (e.g., sprayers, floaters, etc.) to deliver an agricultural substance (e.g., fertilizer, pesticides, herbicides, or other products) to a ground surface of a field. The ground surface may include an earth material that supports one or more objects (e.g., crops) extending therefrom. The agricultural applicator can include a boom assembly configured to facilitate product delivery over wide swaths of the field.

The boom assembly can include first and second boom arms that extend from opposing side portions of a frame of the boom assembly. Each of the first and second boom arms may be movable between a folded, inoperative position and an extended, operative position relative to the frame to reduce the width of the boom assembly when either of the boom arms is not in use. In some instances, hydraulic actuators fold the boom arms horizontally to keep the folding height as low as possible for transport clearance.

During application of the agricultural substance, one or more of the boom arms are placed in the extended, operative position and configured to spray or otherwise dispense the agricultural substance onto the underlying field. With the boom arms extended, each of the boom arms may oscillate and/or apply torque to the frame of the boom assembly due to the cantilevered nature of each boom arm. It is generally desirable to dampen the oscillations through a hydraulic suspension. In addition, with one boom arm in an unfolded position and the other in a folded position, the frame of the boom assembly has stress concentrated on a portion of the frame that is proximate to the unfolded boom arm, which can lead to unwanted wear on the boom assembly and work vehicle. It is also generally desirable to disperse the stress throughout the hydraulic suspension.

Accordingly, an improved hydraulic suspension for a boom assembly of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In some embodiments, the present subject matter is directed to a boom assembly for an agricultural applicator. The boom assembly includes a mast configured to couple with a work vehicle. A frame supports first and second boom arms extending from opposing side portions of the frame. Each of the first and second boom arms is configured to move between a folded position and an unfolded position. A hydraulic suspension is operably coupled to the frame and the mast and defines a hydraulic circuit having a hydraulic fluid therein. The hydraulic suspension includes first and second actuators configured to mechanically interconnect opposing side portions of the frame to the mast. The suspension also includes a damping assembly positioned in fluid communication with the first and second actuators. A first valve is actuatable between first and second states to alter fluid flow between the first actuator and the damping assembly. The first valve is positioned in the first state when the first boom arm is in the unfolded position and in the second state when the first boom arm is in the folded position while the second boom arm is in the unfolded position. A second valve is actuatable between first and second states to alter fluid flow between the second actuator and the damping assembly. The second valve is positioned in the first state when the second boom arm is in the unfolded position and in the second state when the second boom arm is in the folded while the first boom arm is positioned in the unfolded position.

In some embodiments, the present subject matter is directed to a method for damping a boom assembly through a hydraulic suspension of an agricultural applicator. The method includes activating a positioning assembly to move one of a first boom arm or a second boom arm from a folded position to an unfolded position relative to a frame. The method also includes discharging first and second accumulators within a hydraulic circuit, wherein the first accumulator is in fluid communication with a first actuator through a first valve actuatable between a first state and a second state and the second accumulator is in fluid communication with a second actuator through a second valve actuatable between a first state and a second state. Lastly, the method further includes activating the second valve from the first state to the second state while the first valve is maintained in the first state when the first boom arm is placed in the unfolded position and the second boom arm is maintained in the folded position.

In some embodiments, the present subject matter is directed to a boom assembly for an agricultural applicator. The boom assembly includes a mast configured to be coupled with a work vehicle. A frame supports first and second boom arms extending from opposing side portions of the frame. Each of the first and second boom arms is configured to move between a folded position and an unfolded position. A hydraulic suspension is operably coupled to the frame and the mast and defines a hydraulic circuit having a hydraulic fluid therein. The hydraulic suspension includes first and second actuators configured to mechanically interconnect opposing side portions of the frame to the mast. A damping assembly is positioned in fluid communication with the first and second actuators. The damping assembly is configured to alter the hydraulic suspension between first and second damping levels.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary

DETAILED DESCRIPTION OF THE INVENTION

Figure 1:
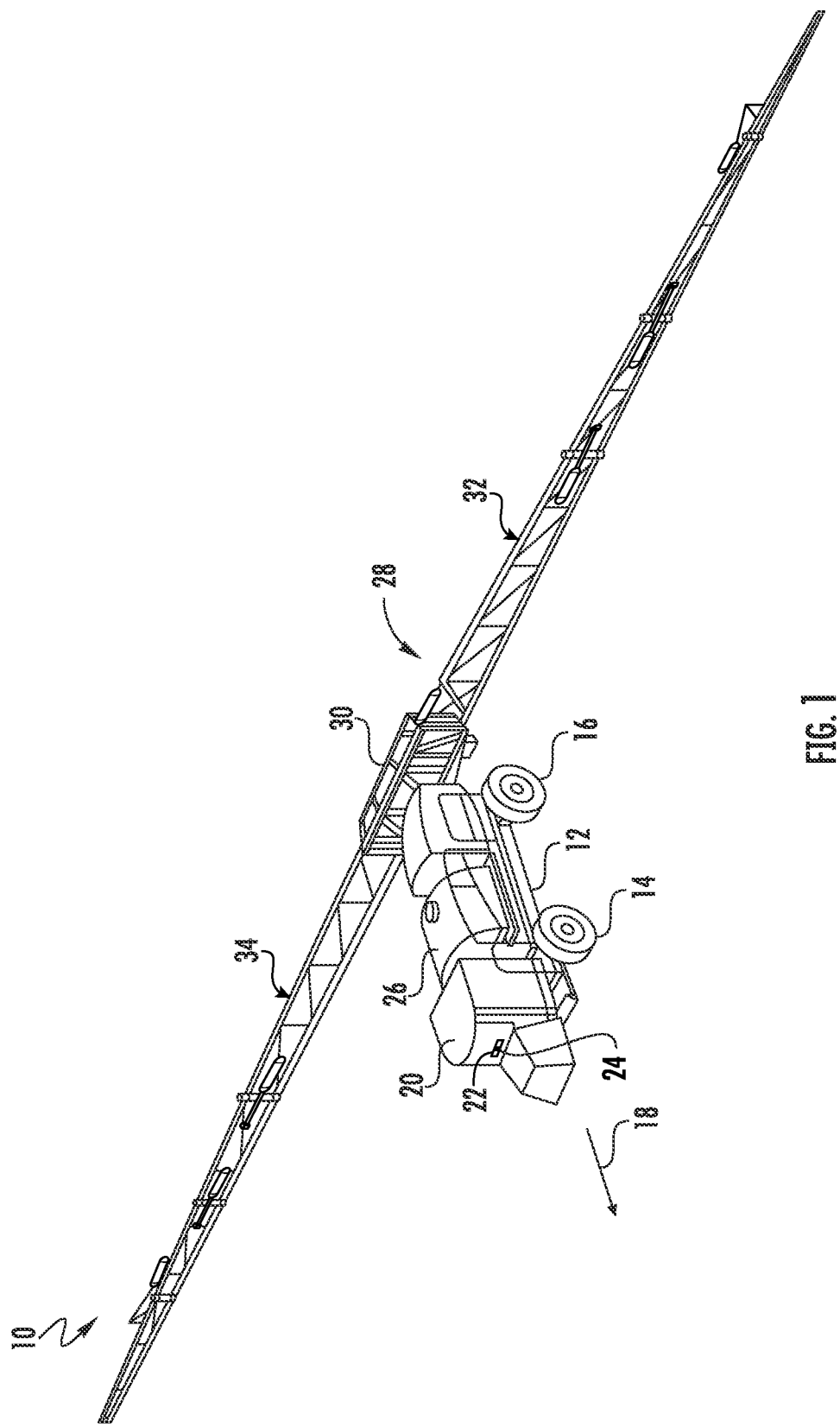
FIG. 1 illustrates a perspective view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of some embodiments can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for dampening movement of a boom assembly of a work vehicle. In several embodiments, the boom assembly may include a mast configured to couple with a work vehicle. A frame supports first and second boom arms extending from opposing side portions of the frame. In addition, each of the first and second boom arms may be configured to move between a folded, inoperative position and an unfolded, operative position independently such that the boom assembly may place the first and second boom arms both in the folded position, the first and second boom arms both in the unfolded position, the first boom arm in the unfolded position with the second boom arm in the folded position, and/or the first boom arm in the folded position with the second boom in the unfolded position.

When one or both of the first and second boom arms are unfolded, the boom arm(s) may oscillate or otherwise move from a stationary position due to the cantilevered nature of the first and second boom arms. The oscillation of the boom may lead to misapplication of the agricultural substance and/or unwanted wear on the boom assembly and work vehicle. Thus, in several embodiments, a hydraulic suspension is operably coupled to the frame and the mast. The hydraulic suspension defines a hydraulic circuit having a hydraulic fluid therein that assists in damping movement of the frame relative to the mast.

In several embodiments, the hydraulic circuit includes first and second actuators positioned within the hydraulic circuit that are configured to mechanically interconnect opposing side portions of the frame to the mast. Each of the first and second actuators is operably coupled with a one or more accumulators, which allows for fluid flow paths that creates damping of the frame of the boom assembly relative to the mast.

In several embodiments, first and second valves are respectively positioned between the first and second actuators and the accumulators. The first and second valves allow for flow from the accumulators to various portions of the actuators based on the state of the valve. In various embodiments, the actuating of the first and second valves is based on which boom arm(s) is in the unfolded position. For example, the first valve may be positioned in a first state when the first boom arm is in the unfolded position and in a second state when the first boom arm is in the folded position while the second boom arm is in the unfolded position. Conversely, the second valve may be positioned in a first state when the second boom arm is in the unfolded position and in a second state when the second boom arm is in the folded while the first boom arm is in the unfolded position. By actuating the valves based on the orientation of the first and second boom arms, stress on the frame may be dispersed therethrough versus located in a more concentrated manner on a side portion of the frame proximate to the extended boom arm(s). In addition, the boom assembly may be generally releveled each time the orientation of one or more boom arms is altered. By leveling the boom assembly based on each new orientation, the stress on the frame may also be dispersed. Furthermore, the releveling of the boom assembly between each new orientation may also allow for a more consistent application of the agricultural substance as the boom arm is generally placed in a consistent position during use in each orientation. It will be appreciated that leveling of the boom assembly, as used herein, refers to rotating the frame, and boom arms, from a first position to a second, desired position. In some cases, the second, desired position may be a position that is generally parallel to a ground surface. However, the second, desired position may be any other offset between the frame/boom arms from the ground surface or the mast.

In several embodiments, the hydraulic circuit defines a damping assembly therein. The damping assembly may alter the damping level of the hydraulic suspension through various levels, which may range from a first damping level, to a second damping level that is greater than the first damping level, to a third damping level that provides a generally rigid condition between the frame and the mast of the boom assembly.

In some embodiments of the present subject matter, a controller may be configured to control the operation of the hydraulic suspension in order to adjust the orientation (or leveling) of the boom assembly and/or the damping level provided by the damping assembly. In some embodiments, the controller may be configured to control the operation of the hydraulic suspension based on an input received from an operator, such as an input requesting that the orientation of one or more of the boom arms and/or the damping level be adjusted. Additionally, or alternatively, in some embodiments, one or more sensors may be installed on and/or relative to the boom assembly and the controller may be configured to monitor the measurements provided by the one or more sensors and control the operation of the hydraulic suspension based on the feedback from the sensors in order to automatically adjust the orientation of the boom assembly and/or the damping level provided by the damping assembly. As used herein, any automatic adjustment means that there is a lack of user input between the sensor providing a data input and the boom assembly being adjusted. In some cases, the boom assembly may automatically adjust and be followed quickly thereafter by a non-automatic adjustment, or vice versa.

Figure 2:
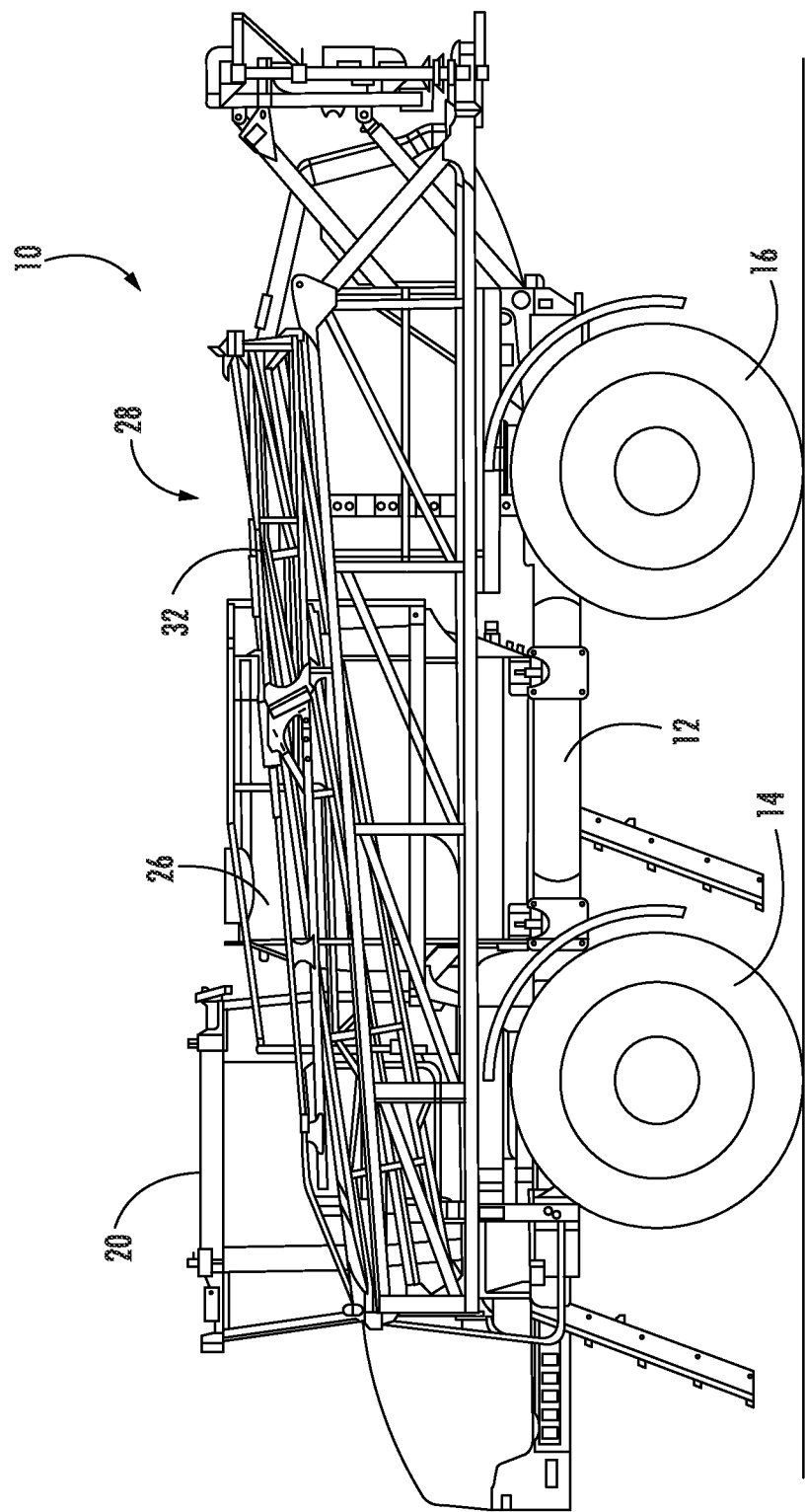
FIG. 2 illustrates a side view of an agricultural applicator in accordance with aspects of the present subject matter; particularly illustrating a folded, inoperative position of a first boom arm of a boom assembly in accordance with aspects of the present subject matter.

Referring now to FIGS. 1 and 2, a work vehicle 10 is configured as a self-propelled agricultural applicator. However, in alternative embodiments, the work vehicle 10 may be configured as any other suitable type of work vehicle 10 configured to perform agricultural application operations, such as a tractor or other vehicle configured to haul or tow an application implement.

In various embodiments, the work vehicle 10 may include a chassis 12 configured to support or couple to a plurality of components. For example, front and rear wheels 14, 16 may be coupled to the chassis 12. The wheels 14, 16 may be configured to support the work vehicle 10 relative to a ground surface and move the work vehicle 10 in a direction of travel (e.g., as indicated by arrow 18 in FIG. 1) across a field or the ground surface. In this regard, the work vehicle 10 may include a power plant, such as an engine, a motor, or a hybrid engine-motor combination, to move the vehicle 10 along the field. In some instances, the work vehicle 10 may also include a transmission configured to transmit power from the engine to any of the wheels 14, 16.

The chassis 12 may also support an operator's station 20, such as a cab, that provides various control or input devices (e.g., levers, pedals, control panels, buttons, and/or the like) for permitting an operator to control the operation of the work vehicle 10. For instance, as shown in FIG. 1, the work vehicle 10 may include a human-machine interface (HMI) 22 for displaying message and/or alerts to the operator and/or for allowing the operator to interface with the vehicle's controller. In some embodiments, the HMI 22 may include one or more user-input devices 24 in the form of switches, buttons, knobs and/or any other device that allows the operator to provide user inputs to the controller.

In addition, the chassis 12 may also support a tank 26 and a boom assembly 28 mounted to the chassis 12. The tank 26 is generally configured to store or hold an agricultural substance, such as a pesticide, a fungicide, a rodenticide, a fertilizer, a nutrient, and/or the like. The agricultural substance stored in the tank 26 may be dispensed onto the underlying ground surface (e.g., plants and/or soil) through one or more dispensers (such as nozzles) mounted on the boom assembly 28.

As shown in FIGS. 1 and 2, the boom assembly 28 can include a frame 30 that supports first and second boom arms 32, 34 in a cantilevered nature. The first and second boom arms 32, 34 are generally movable between an operative or unfolded position (FIG. 1) and an inoperative or folded position (FIG. 2). When distributing product, the first and/or second boom arm 32, 34 extends laterally outward from the work vehicle 10 to cover wide swaths of soil, as illustrated in FIG. 1. However, to facilitate transport, each boom arm 32, 34 of the boom assembly 28 may be independently folded forwardly or rearwardly into the inoperative position, thereby reducing the overall width of the vehicle 10, or in some examples, the overall width of a towable implement when the applicator is configured to be towed behind the work vehicle 10.

Figure 3:
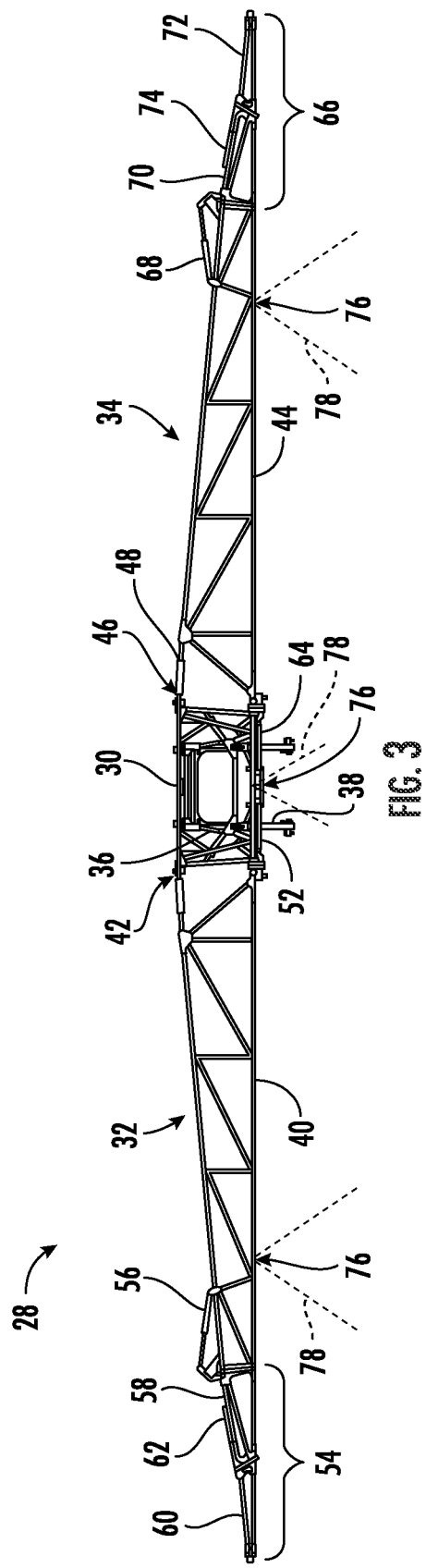
FIG. 3 illustrates a rear view of a boom assembly of a work vehicle in accordance with aspects of the present subject matter.

Referring to FIG. 3, the boom assembly 28 includes a mast 36 coupled to a frame 30. In some embodiments, such as the one illustrated in FIG. 3, the mast 36 is configured to couple to the work vehicle 10 (FIG. 2) via a linkage assembly 38. In the illustrated embodiment, the frame 30 and the mast 36 are aligned with one another along a direction of travel 18 (FIG. 1). As a result, the torque applied to the mast 36 by the frame 30 is substantially less than the torque applied by a frame 30 positioned behind the mast 36. Consequently, the frame 30 and the mast 36 may employ lighter structural members and/or fewer structural members to resist the torque, thereby decreasing the weight of the boom assembly 28. The reduced weight of the boom assembly 28 decreases the load applied to the vehicle 10, thereby reducing soil compaction and/or facilitating the use of smaller/less powerful vehicles. Due to the decreased acquisition and operating costs of the smaller/less powerful vehicles, the overhead associated with crop production may be significantly reduced.

With further reference to FIG. 3, the frame 30 is configured to support the first and second boom arms 32, 34 during operation and transport. As illustrated, the first and second boom arms 32, 34 are coupled to and extend from opposing side portions of the frame 30. In some examples, an inner section 40 of the first boom arm 32 is pivotally coupled to a first lateral side portion 42 of the frame 30, and an inner section 44 of the second boom arm 34 is coupled to an opposite, second lateral side portion 46 of the frame 30. In this configuration, the first and second boom arms 32, 34 may be folded forwardly or rearwardly from the illustrated operative position to an inoperative position that reduces the overall width of the vehicle 10.

In some examples, such as the embodiment illustrated in FIG. 3, the boom assembly 28 includes a positioning assembly 48 operably coupled to the frame 30 and the first and second boom arms 32, 34. The positioning assembly 48 may be configured to independently move the each of the first and second boom arms 32, 34 between the extended and folded positions. For example, in some embodiments, the first boom arm 32 includes an actuating device 52 (e.g., electromechanical actuator, hydraulic cylinder and/or pneumatic cylinder) extending between the inner section 40 of the first boom arm 32 and the frame 30. In examples in which the actuating device 52 is configured as a hydraulic cylinder and/or pneumatic cylinder, the actuating device 52 may be fluidly coupled to a fluid power supply that provides pressurized fluid to drive a piston rod to extend and retract the first boom arm 32. It will be appreciated that the fluid power supply may be hydraulic or pneumatic, thereby powering a corresponding hydraulic or pneumatic actuating device 52. In the illustrated embodiment, extension of the piston rod drives the first boom arm 32 into the illustrated operative position, and retraction of the piston rod drives the first boom arm 32 into the inoperative position. That is, retraction of the piston rod induces the first boom arm 32 to rotate forwardly about a pivot, thereby reducing the overall width of the vehicle 10. In examples that utilize an electromechanical actuator, the actuating device may include a motor electrically coupled with a power source that is configured to rotate the first boom arm 32 between the unfolded, operative position and the folded, inoperative position.

The first boom arm 32 also includes an outer portion 54 having a peripheral actuating device 56. As illustrated, the outer portion 54 is coupled to the inner section 40 by a pivotal joint. Like the actuating device 52, the peripheral actuating device 56 may be an electromechanical actuator, hydraulic cylinder and/or pneumatic cylinder. In examples utilizing a hydraulic and/or pneumatic cylinder, the cylinder may be configured to displace a piston rod extending from the device 56. Retracting the piston rod of the device 56 will cause the outer portion 54 to rotate upwardly from the illustrated product distribution/operative position to an inoperative position. However, it will be appreciated that alternative embodiments may employ outer portions configured to rotate forwardly or rearwardly to the inoperative position.

In the illustrated embodiment, the outer portion 54 includes an outer section 58, a breakaway section 60, and a biasing member 62. The outer section 58 extends between the inner section 40 and the breakaway section 60. The breakaway section 60 is pivotally coupled to the outer section 58 by a joint, and the biasing member 62 is configured to urge the breakaway section 60 toward the illustrated operative position. In this configuration, contact between the breakaway section 60 and an obstruction will drive the breakaway section to rotate. After the boom has passed the obstruction, the biasing member 62 will urge the breakaway section back to the operative position.

The structure of the second boom arm 34 is similar to the structure of the first boom arm 32. For instance, the second boom arm 34 includes an actuating device 64 (e.g., electromechanical actuator, hydraulic cylinder and/or pneumatic cylinder) extending between the inner section 44 and the frame 30. The device 64 may be electrically coupled with a power supply and/or fluidly coupled to a fluid power supply that provides pressurized fluid to drive a piston rod to extend and retract. It will be appreciated that the fluid power supply may be hydraulic or pneumatic, thereby powering a corresponding hydraulic or pneumatic device 64. In the illustrated embodiment, extension of the piston rod drives the second boom arm 34 into the illustrated operative position, and retraction of the piston rod drives the second boom arm 34 into the inoperative position. That is, retraction of the piston rod induces the second boom arm 34 to rotate forwardly about a pivot, thereby reducing the overall width of the vehicle 10.

The second boom arm 34 also includes an outer portion 66 having a peripheral actuating device 68. As illustrated, the outer portion 66 is coupled to the inner section 44 by a pivotal joint. Like the device 64, the peripheral actuating device 68 may be an electromechanical actuator, hydraulic cylinder and/or pneumatic cylinder configured to rotate the outer portion 66 relative to the inner section 44 by electromechanically rotating the outer portion 66 and/or displacing a piston rod extending from the peripheral actuating device 68. Retracting the piston rod of the peripheral actuating device 68 will cause the outer portion 66 to rotate upwardly from the illustrated product distribution/operative position to an inoperative position. In some embodiments, the outer portions are configured to rotate forwardly or rearwardly to the inoperative position.

In the illustrated embodiment, the outer portion 66 also includes an outer section 70, a breakaway section 72, and a biasing member 74. The outer section 70 extends between the inner section 44 and the breakaway section 72. The breakaway section 72 is pivotally coupled to the outer section 70 by a joint, and the biasing member 74 is configured to urge the breakaway section 72 toward the illustrated operative position. In this configuration, contact between the breakaway section 72 and an obstruction will drive the breakaway section to rotate. After the boom has passed the obstruction, the biasing member 74 will urge the breakaway section back to the operative position. Although the boom assembly 28 is shown in FIG. 3 as including first and second boom arms 32, 34 each having an inner section and an outer portion coupled to each side portion of the frame 30, the boom assembly 28 may generally have any suitable number of boom arms 32, 34.

With further reference to FIG. 3, in various embodiments, the work vehicle 10 may include one or more sensors 76 configured to capture data indicative of an orientation or position of the boom assembly 28 relative to the ground surface 80. In some instances, the sensor(s) 76 may be installed or otherwise positioned on the boom assembly 28. For example, as shown in FIG. 3, a sensor 76 may be positioned on each of the first and second boom arms 32, 34. As such, each sensor 76 may have a field of view directed toward a location underneath and/or in front of the boom assembly 28 relative to the direction of travel 18, as illustrated, according to some examples, by dashed lines 78 in FIG. 3. In this regard, each sensor 76 may be able to capture data indicative of the profile or contour of the ground surface 80 (FIG. 4) within its field of view 78. In one embodiment, the captured data may be indicative of a distance between the associated sensor 76 and the ground surface 80, with such distance(s) generally being associated with the distance between the respective boom arm 32, 34 and the ground surface 80. Based on the detected distance, various metrics may be determined, such as a frequency of oscillation of the first or second boom arm 32, 34. In some example, the sensor(s) 76 may be positioned at any other suitable location(s) on and/or coupled to any other suitable component(s) of the work vehicle 10. In various examples, the work vehicle 10 may include any suitable number of sensors 76 and should not be construed as being limited to the number of sensors 76 shown in FIG. 3.

In various examples, the sensor(s) 76 may generally correspond to any suitable sensing device(s) for detecting data related to position, angle, displacement, distance, speed, acceleration of any component of the boom assembly 28. For example, in some embodiments, the sensor(s) 76 may be light detection and ranging (LIDAR) sensors that are configured to emit one or more output signals for reflection off of the ground surface 80 and receive or sense the return signal(s). Additionally, or alternatively, the sensor(s) 76 may correspond to a radio detection and ranging (RADAR)

sensor(s), a Hall effect sensor(s), a gyroscope sensor(s), a magnetometer sensor(s), an accelerometer sensor(s), a yaw-rate sensor(s), a piezoelectric sensor(s), a position sensor(s), a complementary metal-oxide-semiconductor (CMOS) sensor(s), a pressure sensor(s), a capacitive sensor(s), an ultrasonic sensor(s), or any other suitable type of sensor(s).

Figure 4:
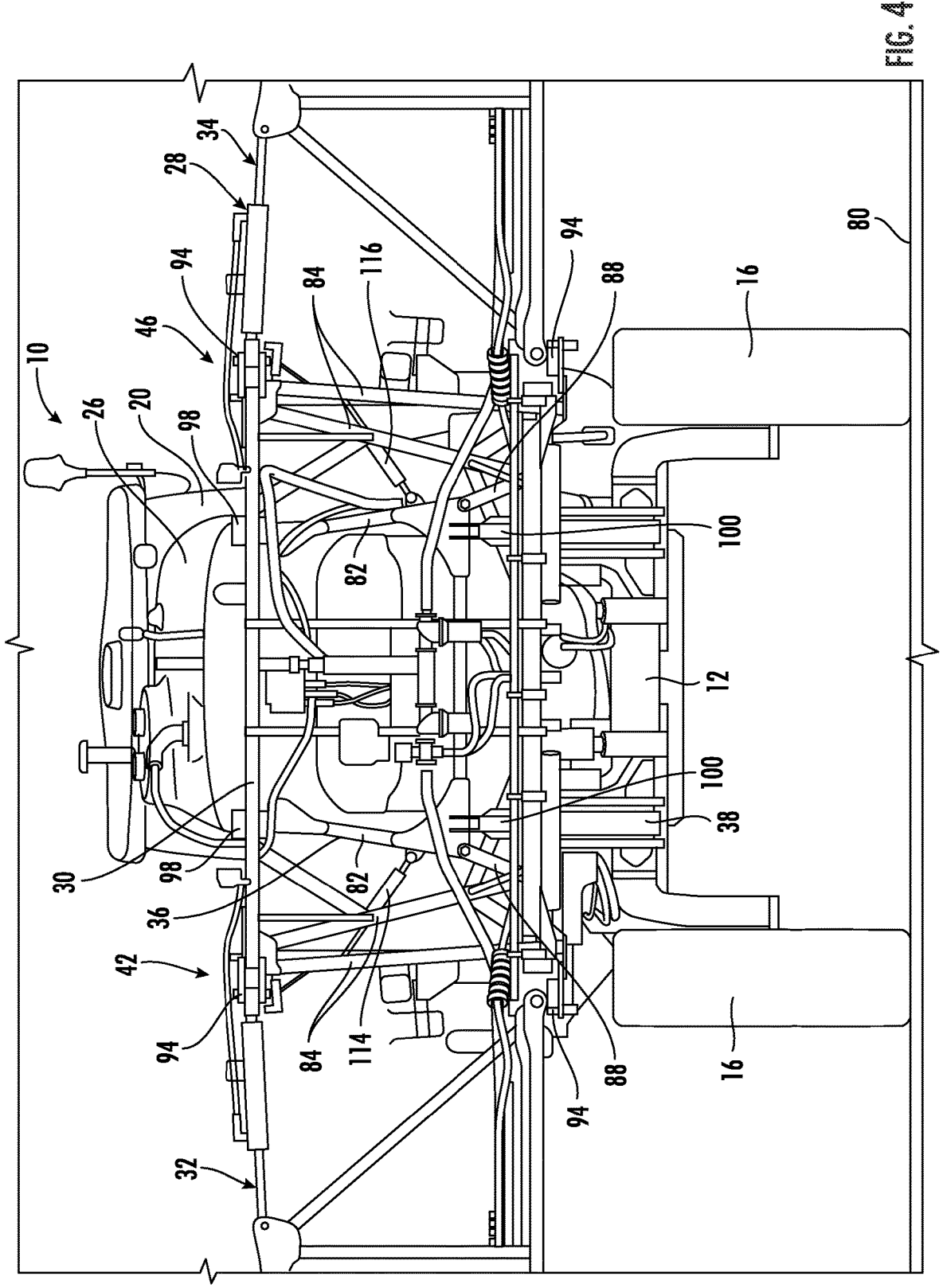
FIG. 4 illustrates a rear partial view of one embodiment of a boom assembly of the work vehicle, particularly illustrating the boom assembly including a mast coupled with the vehicle and a frame of the boom assembly in accordance with aspects of the present subject matter.
Figure 5:
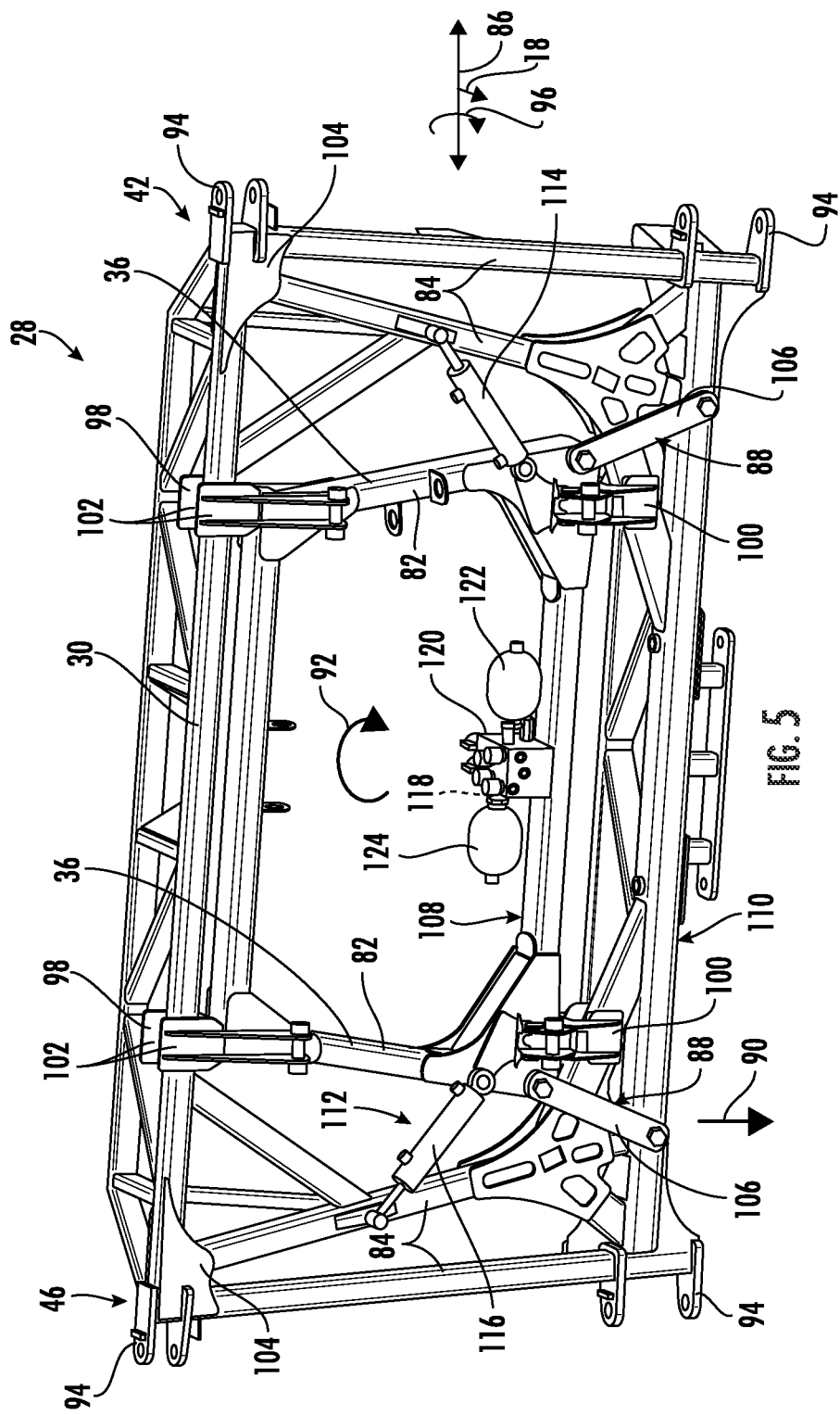
FIG. 5 illustrates a front perspective view of a hydraulic suspension operably coupled to the frame and the mast in accordance with aspects of the present subject matter.

Referring to FIGS. 4 and 5, a linkage assembly 38 extends between a mobile chassis (e.g., the chassis 12 of the work vehicle 10) and the mast 36 to support the mast 36, and to facilitate height adjustment of the mast 36 relative to the ground surface 80. In this manner, the height of the boom assembly 28 relative to the ground surface 80 may be adjusted to accommodate various crops, soil conditions and/or delivered products, for example.

In some examples, such as the ones illustrated in FIGS. 4 and 5, the frame 30 is disposed about the mast 36, and the frame 30 and the mast 36 are aligned with one another along the direction of travel 18 (FIG. 1). In the embodiment, the mast 36 includes multiple structural tubes 82 having substantially rectangular cross sections, and the center section frame 30 includes multiple structural tubes 84 having substantially rectangular cross sections. The structural tubes 84 of the frame 30 are aligned with a first plane 86 substantially perpendicular to the direction of travel 18, and the structural tubes 82 of the mast 36 are aligned with a second plane substantially perpendicular to the direction of travel 18. In the illustrated embodiment, the first and second planes are aligned with one another along the direction of travel 18, thereby aligning the frame 30 and the mast 36 in a fore/aft direction. Consequently, the overall vehicle length may be reduced, as compared to configurations in which the frame 30 is positioned behind the mast 36. Furthermore, due to the alignment of the mast 36 and the frame 30, the overhung load on the linkage assembly 38 and/or the vehicle chassis 12 may be significantly reduced. Therefore, the linkage assembly and/or vehicle chassis 12 may include lighter and/or fewer structural elements, thereby reducing the overall weight of the work vehicle 10.

As illustrated in FIGS. 4 and 5, in some embodiments, the frame 30 is coupled to the mast 36 via a linkage 88 configured to transfer the downward load 90 of the frame 30 to the mast 36. For instance, the weight of the first and second boom arms 32, 34 is supported by the frame 30, and the frame 30 transfers the load to the mast 36 via the linkage 88. The mast 36, in turn, transfers the load to the vehicle chassis 12 via the linkage assembly 38, thereby suspending the boom assembly 28 above the ground surface 80.

Furthermore, the linkage 88 facilitates rotation of the frame 30 relative to the mast 36 in a direction 92 (i.e., about an axis parallel to the direction of travel 18). As a result, the boom may remain substantially parallel to the ground surface 80 despite movement of the vehicle 10. For example, if the vehicle 10 tilts to one side due to variations in the terrain, the boom may rotate about the mast 36 to remain substantially level relative to the ground surface 80. Consequently, a height of each applicator (e.g., spray nozzle) may be maintained at a desired distance above the ground surface 80.

With further reference to the examples illustrated in FIGS. 4 and 5, the frame 30 includes multiple supports 94 coupled to the frame 30 and configured to rotatably couple the first and second boom arms 32, 34 to the frame 30. For example, each support 94 may include openings configured to receive a pin coupled to a respective boom arm 32, 34. In this configuration, the supports 94 will bear the downward load 90 of the first and second boom arms 32, 34, while facilitating rotation of the first and second boom arms 32, 34 between the operative position and the inoperative position. As previously discussed, the first and second boom arms 32, 34 are configured to rotate to the inoperative position. While in the inoperative position, the first and second boom arms 32, 34 can urge the frame 30 to rotate in a direction 96 about an axis 86 perpendicular to the direction of travel 18 (FIG. 1). Consequently, the mast 36 may include multiple guides configured to interface with the frame 30 to block rotation of the frame 30 relative to the mast 36 about the axis 86. For example, in the embodiments illustrated in FIGS. 4 and 5, the frame 30 includes upper guides 98 coupled to an upper portion of the frame 30, and lower guides 100 coupled to a lower portion of the frame 30. As illustrated, the guides 98 and 100 include liners 102 configured to facilitate lateral movement of the center section frame 30 as the frame 30 rotates relative to the mast 36 in the direction 92. Accordingly, the guides 98 and 100 block rotation of the frame 30 in the direction 96, while enabling the frame 30 to rotate in the direction 92.

In addition, in various examples, the first and second boom arms 32, 34 urge the frame 30 to rotate in the direction 96 while the first and second boom arms 32, 34 are in the inoperative position. The guides 98 and 100 block rotation of the frame 30 relative to the mast 36, thereby inducing a torque within the center section frame 30. Supports 104 are configured to resist the torque, thereby enabling the frame 30 to support the first and second boom arms 32, 34 while the first and second boom arms 32, 34 are in the inoperative position.

As previously discussed, the frame 30 is coupled to the mast 36 via a linkage 88 configured to transfer the downward load 90 of the frame 30 to the mast 36. The linkage 88 includes multiple links 106 extending from a lower portion 108 of the mast 36 to a lower portion 110 of the frame 30. The linkage 88 facilitates rotation of the frame 30 relative to the mast 36 in a direction 92. As a result, the boom may remain substantially parallel to the ground surface 80 despite movement of the vehicle 10. Furthermore, a hydraulic suspension 112 extends between the frame 30 and the mast 36 and is configured to damp rotary oscillations of the frame 30 relative to the mast 36, thereby providing a stable platform for the applicators and/or dispersing stress experienced by the frame.

In some examples, such as the embodiments illustrated in FIGS. 4 and 5, the hydraulic suspension 112 can include first and second actuators 114, 116 that can be configured to mechanically interconnect opposing side portions of the frame to the mast 36. The first and second actuators 114, 116 are interconnected through a hydraulic circuit 118 that is at least partially housed within a hydraulic manifold 120, which may be affixed to the boom assembly 28. In addition, the hydraulic manifold 120 may support first and second accumulators 122, 124 within the hydraulic circuit 118.

In operation, in some applications, one of the first or second boom arms 32, 34 can be placed in the unfolded, operative position while the other of the first or second boom arm 32, 34 is in the folded position to apply an agricultural substance from one side of the boom assembly 28. For instance, while applying the agricultural substance to a border or boundary region of a ground surface 80, the operator may desire to have one of the first or second boom arm 32, 34 in the extended, operative position while the other of the first or second boom arm 32, 34 is placed in the folded, inoperative position. The boundary region may be a region that is proximate to an outer perimeter of a field and/or proximate to an object. During asymmetrical use of the boom assembly 28, the hydraulic suspension 112 may be capable of generally leveling the boom assembly 28 relative to the ground surface 80. In addition to aiding in leveling the boom assembly 28, the hydraulic suspension 112 can include a damping assembly 126 (FIG. 6) that is positioned in fluid communication with the first and second actuators 114, 116 and is configured to alter the hydraulic suspension 112 at least between first and second damping levels. The damping level provided by the damping assembly 126 may be based on an operator input and/or automatically chosen without operator input based on data from the one or more sensors 76 of the boom assembly 28.

Figure 6:
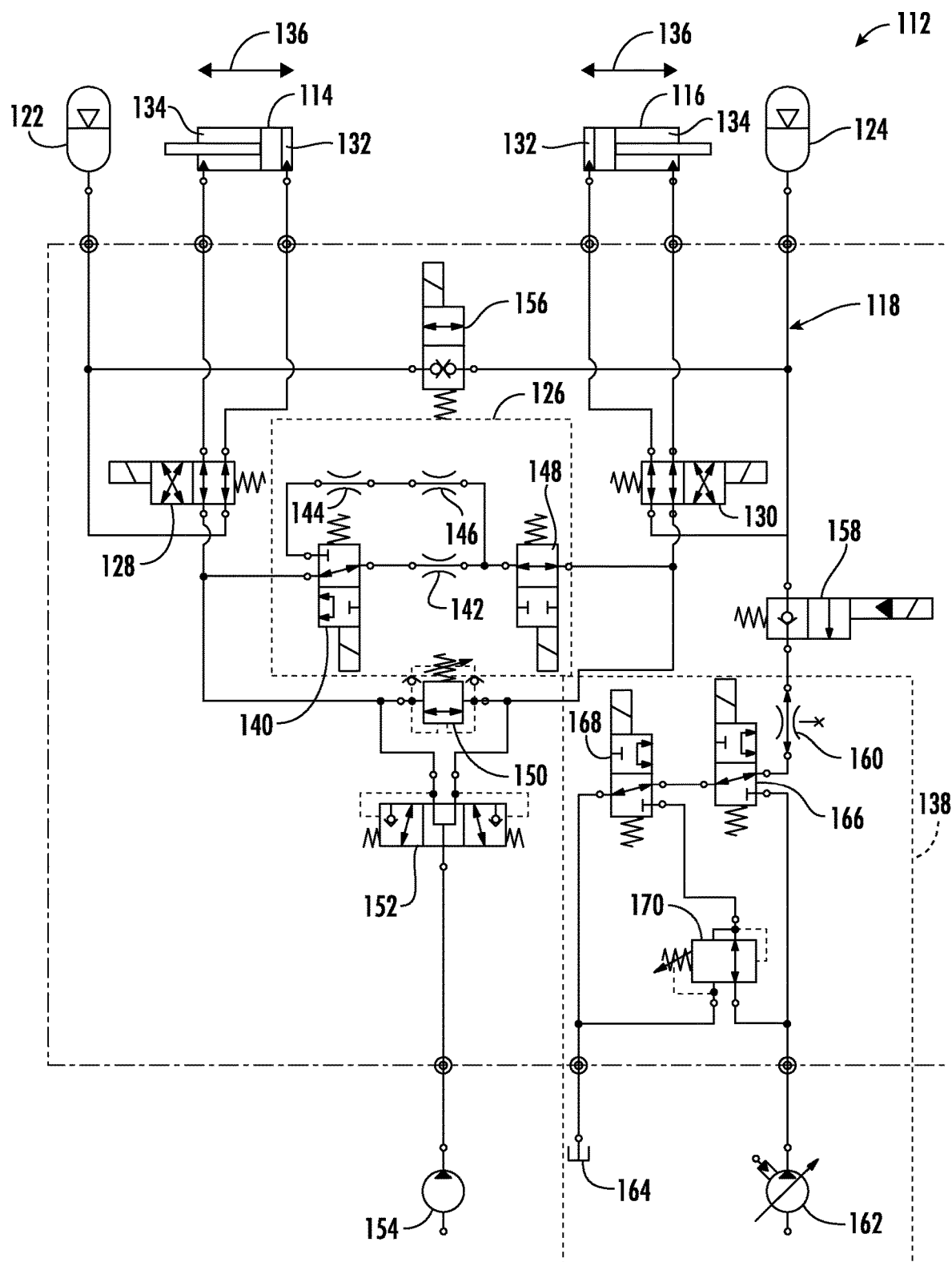
FIG. 6 illustrates a hydraulic circuit diagram that forms one embodiment of the disclosed hydraulic suspension in accordance with aspects of the present subject matter.

Referring to FIG. 6, the hydraulic suspension 112 may be configured to restrain or reduce oscillating movement of the boom assembly 28 relative to the mast 36 and includes the first and second actuators 114, 116, the damping assembly 126 positioned in fluid communication with the first and second actuators 114, 116, a first valve 128 actuatable between first and second states to alter fluid flow between the first actuator 114 and the damping assembly 126, and a second valve 130 actuatable between first and second states to alter fluid flow between the second actuator 116 and the damping assembly 126.

The first and second actuators 114, 116 are configured to mechanically interconnect opposing side portions of the frame to the mast 36. Each of the first and second actuators 114, 116 may be configured as a linear-actuated cylinder that includes a bore portion 132 and a rod portion 134 movable in a linear direction (illustrated by arrow and reference 136) with respect to the bore portion 132. In some examples, the bore portion 132 of each of the first and second actuators 114, 116 is connected to the mast 36, and the rod portion 134 of each of the first and second actuators 114, 116 is connected to the frame 30 of the boom assembly 28, or vice versa. Alternatively, the first and second actuators 114, 116 can be combined into a double-extendible rod actuator having a single cylinder portion operatively connectively to move spaced apart rods connected at opposite left-hand and right-hand lateral positions along the frame 30 of the boom assembly 28.

The first accumulator 122 is in fluid communication with the first actuator 114 and the second accumulator 124 is in fluid communication with the second actuator 116. The first and second accumulators 122, 124 can be pre-charged with pressure so as to provide an opposing force to the rotation of the frame 30 about the mast 36. The spring force provided by each accumulator 122, 124 is adjustable by varying the pre-charged pressure of the first and second accumulators 122, 124. In various examples, a charge/discharge circuit 138 within the hydraulic suspension 112 provides a desired charged pressure of the first and second accumulators 122, 124. In some instances, the first and second accumulators 122, 124 are recharged each time one or more of the first or second boom arms 32, 34 are moved from the folded position to the unfolded position, or from the unfolded position to the folded position.

The first valve 128 is actuatable between first and second states to alter fluid flow between the first actuator 114 and the damping assembly 126. In some embodiments, the first valve 128 can be positioned in the first state when the first boom arm 32 is in the unfolded position and in the second state when the first boom arm 32 is in the folded position while the second boom arm 34 is in the unfolded position. Likewise, a second valve 130 is actuatable between first and second states to alter fluid flow between the second actuator 116 and the damping assembly 126. The second valve 130 can be positioned in the first state when the second boom arm 34 is in the unfolded position and in the second state when the second boom arm 34 is in the folded position while the first boom arm 32 is in the unfolded position. When both of the first and second boom arms 32, 34 are placed in the folded or unfolded position, the first and second valves 128, 130 are both placed in the first state. In various examples, the first and second valves 128, 130 may be configured as a solenoid-operated, 4-way, 2-position, direct-acting valve. When in the first state, the first and second valves 128, 130 allow flow between each respective accumulator 122, 124 and a bore portion 132 of each respective actuator 114, 116. When in the second state, the first and second valves 128, 130 shift to open flow between the respective accumulators 122, 124 and rod portions 134 of the actuators 114, 116.

The damping assembly 126 can be positioned in fluid communication with the first and second actuators 114, 116 and configured to provide for various damping levels, through the movement of the hydraulic fluid through various orifices 142, 144, 146, or restrictions, defined by the hydraulic circuit 118. For example, when the boom assembly 28 oscillates and causes the actuators 114, 116 to extend or contract, the energy is transferred through the frame 30 and into the actuators 114, 116. In response, hydraulic fluid is transferred through the hydraulic circuit and possibly through one or more of the orifices 142, 144, 146. Because the orifices are relatively small when compared to the remaining passageways of the hydraulic circuit 118, a small amount of hydraulic fluid, under an increased pressure, passes therethrough. This slows down the actuators 114, 116 to dampen the oscillations. To provide the various damping levels, the damping assembly 126 can include a third valve 140 that is actuatable between a first state and a second state. The third valve 140 may be configured as a solenoid-operated, 3-way, spool-type, direct-acting directional valve.

In some embodiments, the third valve 140 can direct the hydraulic fluid through a first orifice 142 defined by the damping assembly 126 within the hydraulic circuit 118 when the third valve 140 is in a first state causing the damping assembly 126 to provide a first damping level. Conversely, the third valve 140 can direct the hydraulic fluid through a second orifice 144 defined by the damping assembly 126 within the hydraulic circuit 118 when the third valve 140 is in a second state causing the damping assembly 126 to provide a second damping level. In some cases, a third orifice 146 defined by the damping assembly 126 within the hydraulic circuit 118 may be in series with the second orifice 144. In some cases, the second and third orifices 144, 146 can be positioned in parallel with the first orifice 142. The first damping level provided by the damping system may provide less damping than the second damping level provided by the damping system. In some examples, the first damping level may provide more damping than the second damping level.

In some examples, such as the embodiment illustrated in FIG. 6, the damping assembly 126 can also include a fourth valve 148 that is fluidly positioned between the second valve 130 and the first orifice 142 defined by the damping assembly 126. The fourth valve 148 may be actuatable between first and second states and may be configured as a solenoid-operated, 2-way, normally open, spool-type, direct-acting valve intended for blocking or load-holding within the circuit. Accordingly, when the fourth valve 148 is in the first state, the hydraulic fluid may flow through the damping assembly 126. Conversely, when the fourth valve 148 is in the second state, the flow of hydraulic fluid through the damping assembly 126 is substantially restricted, thereby providing a third damping level. As the flow through the damping assembly 126 is restricted, the third damping level may be a generally rigid condition of the boom assembly 28.

In some embodiments, a relief valve 150 can be positioned in parallel with the damping assembly. The relief valve 150 may be configured to reduce a pressure within the hydraulic suspension 112 when the hydraulic suspension 112 exceeds a threshold pressure. For instance, when the fourth valve 148 in the damping assembly 126 is in the second state thereby generally suspending flow of hydraulic fluid within the manifold 120 of the boom assembly 28, a pressure within the hydraulic suspension 112 may exceed the threshold pressure. The relief valve 150 may extinguish the excessive pressure from the system. In various embodiments, the relief valve 150 may be configured as a cartridge-style, direct-acting, differential area, poppet-type, and/or bi-directional relief valve 150 intended as a pressure-limiting device for protection of the hydraulic circuit 118. On attainment of a predetermined pressure at any port of the relief valve 150, the spring-opposed poppet can be forced from its seat. In some examples, the relief valve 150 may switch from release pressure from the hydraulic circuit 118 when a threshold pressure of 200 bar, or any other pressure, is exceeded.

In some examples, such as the embodiment illustrated in FIG. 6, the hydraulic circuit 118 can further include a fifth valve 152 in parallel with the relief valve 150. The fifth valve 152 may be configured as a cartridge-style inverted shuttle valve, which can be used to help protect against operational failure in the event of loss of pressure in either one of first and second accumulators 122, 124. For example, if one of the first or second accumulators 122, 124 fails, the fifth valve 152 will shift over to protect the good one. When pressure at one of the two load ports of the fifth valve 152 exceeds the other, the poppets can shuttle to allow bi-directional flow between other ports. Moreover, in order to create and maintain a sufficient pressure in the hydraulic circuit 118 under all conditions, a charge pump 154 can be operably coupled with the fifth valve 152.

With further reference to FIG. 6, in some embodiments, a sixth valve 156 can be positioned between the first accumulator 122 and the first switch on a first port side and between the second accumulator 124 and the second switch on a second port side. In some embodiments, the sixth valve 156 may be configured as a solenoid-operated, 2-way, normally closed, needle-type, direct-acting cartridge valve intended for blocking or load-holding in the hydraulic circuit 118. Accordingly, when the sixth valve 156 is in a first state, the sixth valve 156 generally blocks flow in between the first port and the second port until activated. When activated, the valve is placed in a second state in which flow is allowed to pass through the sixth valve 156.

In some embodiments, a seventh valve 158 may be positioned between the sixth valve 156 and a flow regulator 160. In addition, the charge/discharge circuit 138 may be positioned on the opposing side of the flow regulator 160 from the seventh valve 158. In some examples, the seventh valve 158 may be configured as a solenoid-operated, 2-way, normally closed, piloted poppet-type, hydraulic cartridge valve intended to act as a blocking or load-holding device for the hydraulic circuit 118. Accordingly, when the seventh valve 158 is in a first state, the seventh valve 158 may act as a check valve, allowing flow from the charge/discharge circuit 138 therethrough, while blocking flow upstream of the seventh valve 158 from flowing through the flow regulator 160. When the seventh valve 158 is in a second state, the hydraulic fluid within the circuit may flow through the seventh valve 158 and towards the flow regulator 160.

The flow regulator 160 may be configured as a cartridge-style, pressure-compensated, fixed orifice, bi-directional, restrictive type, hydraulic flow control valve. Thus, the flow regulator 160 may maintain a generally constant flow rate regardless of pressure drop across the valve and regardless of flow direction.

In some examples, such as the embodiment illustrated in FIG. 6, the charge/discharge circuit 138 includes the main pump 162, a reservoir 164, an eighth valve 166, a ninth valve 168, and a tenth valve 170. In various embodiments, the charge/discharge circuit 138 charges and discharges the hydraulic circuit 118 based on the orientation of the first and second boom arms 32, 34.

In some embodiments, the pump is configured as a variable displacement pump in which the specific output can be varied under computer control. The pump has internal electronic actuators that vary the specific displacement of the pump in response to an electrical signal. In addition, the pump may be configured to charge the hydraulic circuit 118 of the hydraulic suspension 112 in addition to various other systems of the work vehicle 10.

With further reference to FIG. 6, in the illustrated embodiment, the eighth valve 166 is in fluid communication with the pump. In some examples, the eighth valve 166 is configured as a solenoid-operated, 3-way, spool-type, direct-acting hydraulic directional cartridge valve. When in a first state, the eighth valve 166 allows flow from the flow regulator 160 to the ninth valve 168 while blocking flow from the pump. When in a second state, the eighth valve 166 shifts to open flow from the pump towards the flow regulator 160, while blocking flow from the ninth valve 168. Similarly, the ninth valve 168 may also be configured as a solenoid-operated, 3-way, spool-type, direct-acting hydraulic directional cartridge valve. When in a first state, the ninth valve 168 allows flow from the eighth valve 166 to the reservoir 164. When in a second state, the eighth valve 166 shifts to open flow from the tenth valve 170 towards the eighth valve 166.

In various examples, the tenth valve 170 may be configured as a pressure reducing/relieving valve. For instance, the tenth valve 170 may be a cartridge-style, direct-acting, spool-type, hydraulic pressure reducing/relieving valve. In addition, the tenth valve 170 may include an internal pilot and internal spring chamber drain, designed to act as a pressure-regulating device. In a first state, the tenth valve 170 allows flow to pass bidirectionally from the pump to the ninth valve 168, with the spring chamber constantly drained towards the reservoir 164. On attainment of a pre-determined pressure, the tenth valve 170 shifts to block flow from the pump, thereby regulating pressure from the tenth valve 170. In this mode, the valve also will relieve pressure at a user-specified value over the set reducing pressure.

In operation, the boom assembly 28 may place the first and second boom arms 32, 34 both in the folded position, the first and second boom arms 32, 34 both in the unfolded, operative position, the first boom arm 32 in the unfolded position with the second boom arm 34 in the inoperative, folded position, and/or the first boom arm 32 in the folded position with the second boom 34 in the operative, unfolded position. In addition, at the onset of operation, each of the first through the tenth valves 128, 130, 140, 148, 152, 156, 158, 166, 168, 170 begins in the first state and maintains the first state until actuated to the second state.

When both of the first and second boom arms 32, 34 are positioned in the folded position at the same time, the rod portions 134 of both of the first and second actuators 114, 116 may have a generally common pressure. For instance, in some embodiments, the pressure may be maintained around a pressure of 25 bar, which can be equal to the pressure of the charge pump. It will be appreciated that "around a pressure," as used herein, is to mean that the pressure is within ±20% of the stated pressure.

When both the first and second boom arms 32, 34 are placed in the unfolded, operative positions, the sixth valve 156 and the ninth valve 168 may be placed in the second state and the first and second accumulators 122, 124 are charged to the pre-determined pressure of the tenth valve 170. In some embodiments, the predetermined pressure may be around a pressure of 60 bar, or any other practicable pressure. Once the hydraulic circuit 118 is charged, in some embodiments, the sixth valve 156 and the ninth valve 168 may be actuated to the first state with the bore portion 132 of the first actuator 114 fluidly coupled with the first accumulator 122 and the bore portion 132 of the second actuator 116 fluidly coupled with the second accumulator 124. In some examples, each accumulator 122, 124 may have an initial pressure of 60 bar, or any other practicable pressure. With each accumulator 122, 124 fluidly coupled with the bore side 132 of each actuator 114, 116, the rod sides 134 of each actuator 114, 116 may be fluidly connected to one another and to the charge pump 154. In some instances, the rod side 134 of each actuator 114, 116 may have an initial pressure of 25 bar, or any other practicable pressure.

During operation, the frame 30 will move in relation to the mast 36. For example, in some situations the first boom arm 32 may move upwardly and the second boom arm 34 may move downwardly, meaning the frame 30 has a clockwise rotation (as viewed from the rear of the boom assembly 28 as illustrated in FIG. 3) relative to the mast 36. In response, the second actuator 116 may tend to close and the first actuator 114 will tend to open. Or in other words, a hydraulic fluid may flow from the bore side 132 of the second actuator 116 to the second accumulator 124 thereby increasing the pressure within the accumulator, which may cause a spring effect, whereas hydraulic fluid may flow from the first accumulator 122 to the bore side 132 of the first cylinder 114 causing the pressure within the first accumulator 122 to fall below the initial pressure. Concurrently, hydraulic fluid from the rod side 134 of the first actuator 114 will flow to the rod side 134 of the second cylinder 116 and the pressure may be kept nearly constant near their initial pressure (e.g., 25 bar). It will be appreciated that the inverse process may occur when the frame 30 rotates relative to the mast 36 in the counterclockwise direction.

Further, during operation with both of the first and second boom arms 32, 34 in the unfolded, operative positions, the damping assembly 126 may alter damping levels of the boom assembly 28. For example, a first damping level may be provided when the third and fourth valves 140, 148 are both in a first state allowing hydraulic fluid to flow through the first orifice 142 defined by the damping assembly 126. A second damping level may be provided when the third valve 140 is placed in the second state. In some instances, the second level provides more damping than the first level. In addition, as provided herein, the fourth valve 148 may be placed in the second state thereby providing a third level of damping, which may provide a generally rigid condition the boom assembly 28.

When the boom assembly 28 is operated with the first boom arm 32 in the unfolded position and the second boom arm 34 in the folded, inoperative position, the sixth valve 156 and the seventh valve 158 may each be placed in their respective second states to discharge the first and second accumulators 122, 124. Once discharged, the seventh valve 158 may be then placed into the first state. In addition to the sixth valve 156 being in the second state, the second valve 130 is also positioned in the second state with the first valve 128 positioned in the first state. With the second valve 130 and the sixth valve 156 in the second state, the eighth valve 166 is actuated from the first state to the second state and the pump charges the hydraulic circuit 118 to a pre-determined pressure causing the frame 30 to be generally level with the mast 36.

Once the frame 30 and the mast 36 are generally level, the eighth valve 166 returns to the first state with the second valve 130 remaining in the second state such that the bore side 132 of the first actuator 114, the rod side 134 of the second actuator 116, and the two accumulators 122, 124 are fluidly connected together with a generally common initial pressure. In some instances, the bore side 132 of the first actuator 114, the rod side 134 of the second actuator 116, and the two accumulators 122, 124 may all have a pressure close to 55 bar, or any other practicable pressure. Further, the initial pressure may be determined by a pressure that is capable of lifting and/or leveling the boom assembly 28. Additionally, the rod side 134 of the first actuator 114 and the bore side 132 of the second actuator 116 are connected to one another and to the charge pump 154. In such instances, the charge pump 156 may keep a generally constant pressure of at the rod side 134 of the first cylinder 114 and the bore side 132 of the second cylinder 116 such that hydraulic fluid is maintained within these components. In some examples, the generally constant pressure may be about 25 bar, or any other practicable pressure.

During operation with the first boom arm 32 in the unfolded position and the second boom arm 34 in the folded position, the frame 30 may rotate in relation to the mast 36. For example, in situations in which the first boom arm 32 moves downwardly, which means the frame 30 has a counterclockwise rotation (as viewed from the rear of the boom assembly 28 as illustrated in FIG. 3), the first actuator 114 may tend to close and the second actuator 116 may tend to open such that hydraulic fluid from the charge pump 156 may enter the rod side 134 of the first actuator 114 and the bore side 132 of the second actuator 116 since these two components may increase in volume. In addition, each of these components may have a generally common pressure, which may be 25 bar or any other practicable pressure. Concurrently, the bore side 132 of the first actuator 114 and the rod side 134 of the second actuator 116 may decrease in volume, sending the hydraulic fluid to the first and second accumulators 122, 124. Thus, the pressure may increase from an initial pressure (e.g., 55 bar) to a higher pressure.

In situations in which the frame 30 rotates in a clockwise direction, the first actuator 114 may tend to open and the second actuator 116 may tend to close such that hydraulic fluid from the rod side 134 of the first actuator 114 and from the bore side 132 of the second actuator 116 may exit through the charge pump 156 since these two compartments may decrease in volume. However, even with a decrease in volume, each compartment may keep a pressure around the initial pressure, such as 25 bar (or any other practicable pressure). Concurrently, the bore side 132 of the first actuator 114 and the rod side 134 of the second actuator 116 increase in volume, receiving hydraulic fluid simultaneously from the first and second accumulators 122, 124 thereby decreasing the pressure in these interconnected compartments below the initial pressure, which may be 55 bar or any other practicable pressure.

During operation, any damping level may be chosen while the first boom arm 32 is unfolded, and the second boom arm 34 is folded. Similarly, when the boom assembly 28 is operated with the second boom arm 34 in the unfolded position and the first boom arm 32 in the folded, inoperative position, the sixth valve 156 and the seventh valve 158 may each be placed in their respective second states to discharge the first and second accumulators 122, 124. Once discharged, the seventh valve 158 may be then placed into the first state. In addition to the sixth valve 156 being in the second state, the first valve 128 is also positioned in the second state with the second valve 130 positioned in the first state. With the first valve 128 and the sixth valve 156 in the second state, the eighth valve 166 is actuated from the first state to the second state and the pump charges the hydraulic circuit 118 to a pre-determined pressure causing the frame 30 to be generally level with the mast 36. Once the frame 30 and the mast 36 are generally level, the eighth valve 166 returns to the first state with the first valve 128 remaining in the second state. In addition, any damping level may be chosen while the first boom arm 32 is folded and the second boom arm 34 is unfolded.

Figure 7:
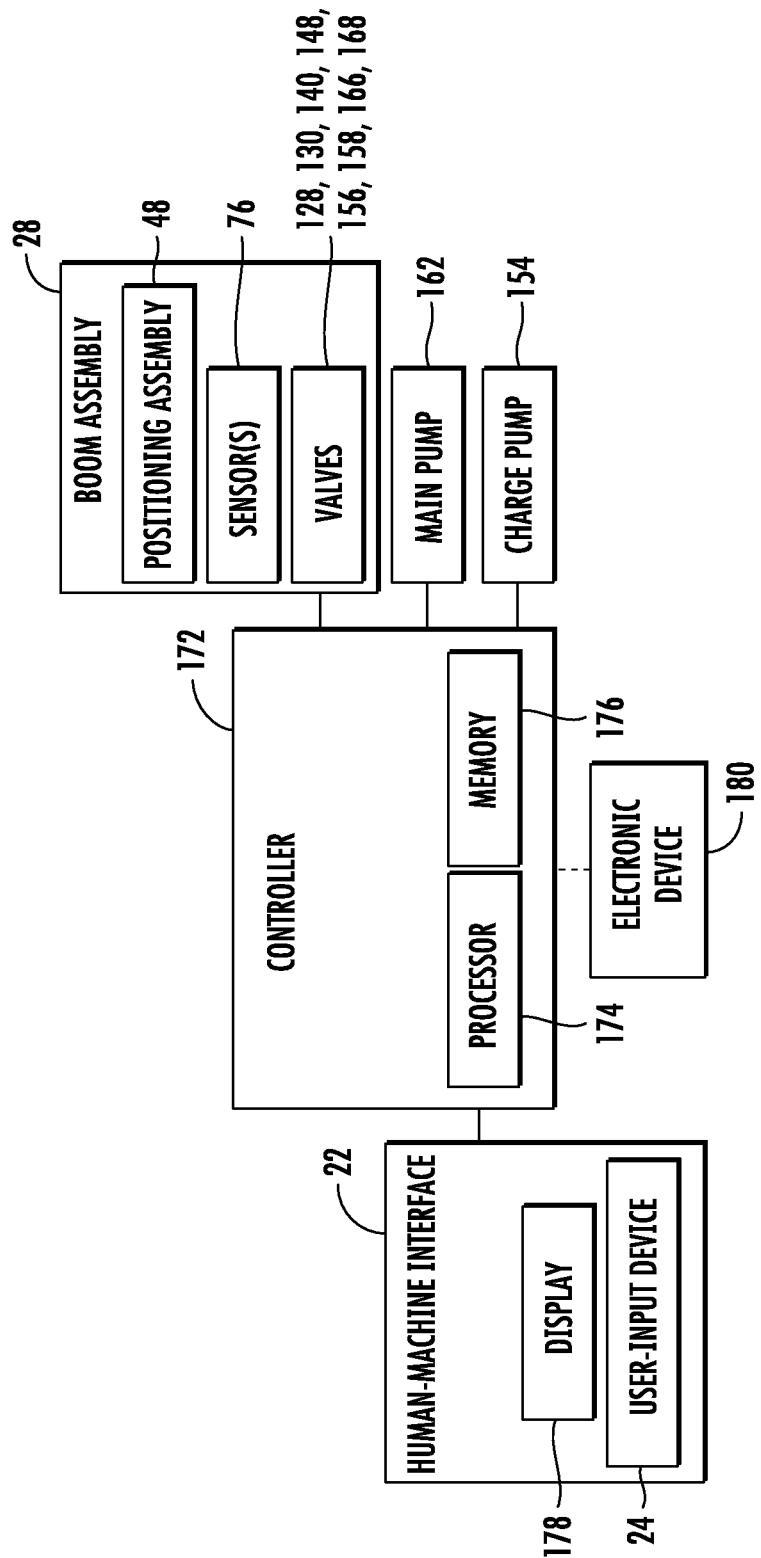
FIG. 7 illustrates a block diagram of components of the hydraulic suspension operably coupled with a controller in accordance with aspects of the present subject matter.

With reference to FIG. 7, the work vehicle 10 includes any of the various components described above, such as the valves 128, 130, 140, 148, 156, 158, 166, 168, the main pump 162, the charge pump 154, and/or the positioning assembly 48, that are each electronically controlled by one or more controllers 172 of the work vehicle 10. The one or more controllers 172 may be disposed in the vehicle 10 and/or within the boom assembly 28 and may correspond to a standalone controller or may be otherwise integrated with an existing vehicle system. In general, the controller 172 may be configured as any suitable processor-based device, such as a computing device or any suitable combination of computing devices. Thus, in several embodiments, the controller 172 may include one or more processor(s) 174 and associated memory device(s) 176 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 176 of the controller 172 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 176 may generally be configured to store suitable computer-readable instructions that, when implemented by the processor(s) 174, configure the controller 172 to perform various computer-implemented functions, such as one or more aspects of the method 200 described below with reference to FIG. 8. In addition, the controller 172 may also include various other suitable components, such as a communications circuit or module, one or more input/output channels, a data/control bus and/or the like.

It should be appreciated that the controller 172 may correspond to an existing controller of the work vehicle 10 or the controller 172 may correspond to a separate processing device. For instance, in one embodiment, the controller 172 may form all or part of a separate plug-in module that may be installed in operative association with the work vehicle 10 to allow for the disclosed system and method to be implemented without requiring additional software to be uploaded onto existing control devices of the work vehicle 10.

In accordance with aspects of the present subject matter, the controller 172 may be configured to control one or more operational parameters of the work vehicle 10 based on the orientation or position of the first and second boom arms 32, 34 of the boom assembly 28 relative to the mast 36. For instance, as shown in FIG. 7, the controller 172 may be communicatively coupled to the positioning assembly 48 for manipulating the first and second boom arms 32, 34 between the folded and unfolded positions. As provided herein, each of the first and second boom arms 32, 34 may include various portions thereof that are movable relative to other portions. The controller 172 may also control the positioning of each portion of the first and second boom arms 32, 34.

Likewise, the controller 172 may actuate the various valves 128, 130, 140, 148, 156, 158, 166, 168 of the hydraulic suspension 112 based on a current orientation of the boom assembly 28. For example, as provided herein, the controller 172 may provide instructions to various valves 128, 130, 140, 148, 156, 158, 166, 168 to actuate from a first state to a second state when both the first and second boom arms 32, 34 are placed in a folded position, or various other valves 128, 130, 140, 148, 156, 158, 166, 168 when one of the first and second boom arms 32, 34 is operated in the unfolded position while the other of the first or second boom arm 32, 34 is in the folded, inoperative position. Similarly, the controller 172 may provide actuation instructions for various valves 128, 130, 140, 148, 156, 158, 166, 168 within the boom assembly 28 when the first and second boom arms 32, 34 are both placed in the unfolded, operative position.

In some examples, the controller 172 may be configured to control the operation of the positioning assembly 48 and/or the components of the hydraulic circuit 118 based on inputs received from the operator of the work vehicle 10. For example, the operator may desire to conduct an application of agricultural substance along a border or boundary region of a ground surface 80, or any other location, where it is desired to have one of the first and second boom arms 32, 34 in the unfolded position with the other of the first or second boom arms 32, 34 in the folded position. In such instances, the controller 172 may provide instructions to the positioning assembly 48 to place the first and second boom arms 32, 34 in a defined position and operate the hydraulic suspension 112 such that the boom assembly 28 is generally level relative to the ground surface 80 with the boom assembly 28 in the desired orientation based on the user input. At any time, the operator may provide an input to the controller 172 (e.g., via the control panel 22 communicatively coupled to the controller 172 through a wired or wireless connection) indicating that the first or second boom arms 32, 34 should be adjusted. The controller 172 may then be configured to initiate control of the operation of the positioning assembly 48 to adjust the orientation of the first or second boom arm 32, 34.

In addition to controlling the positioning of the first and second boom arms 32, 34, the controller 172 may also receive inputs related to a desired damping level from the operator (e.g., via the control panel 22 communicatively coupled to the controller 172 through a wired or wireless connection). Changes to the hydraulic suspension 112 may be provided through the actuation of various valves 128, 130, 140, 148, 156, 158, 166, 168 within the hydraulic suspension 112. In some instances, the user input may provide a default damping level unless a user input is provided by the operator. Or, in some instances, the memory device 176 may store previously used damping levels and alter the damping level of the boom assembly 28 based on stored previous inputs. The previous inputs may also consider various factors, such as the environment, the location of the work vehicle 10, the agricultural substance being applied, the current weather, the frequency and magnitude of oscillation detected by the boom assembly 28, and so on.

In some embodiments, the HMI 22 may include one or more user-input devices 24 in the form of switches, buttons, knobs and/or any other device that allows the operator to provide user inputs to the controller 172. The HMI 22 may include a display 178 that is configured as a touchscreen such as a navigation and/or entertainment display mounted within the operator's station 20, an instrument cluster, and/or any other location within the vehicle 10, which may be capable of providing information relating to usage of the boom assembly 28. In some instances, the input device is incorporated into the HMI 22, which may be implemented by configuring the touchscreen with circuitry to receive an input corresponding with a location over the display 178.

Further, the boom assembly 28 may communicate via wired and/or wireless communication with some instances with one or more handheld or electronic devices 180. The network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic devices 180 may also include a display for displaying one or more images and other information to a user. For instance, the electronic devices 180 may display one or more images of the portable device on the display and may be further able to receive remote user inputs via touchscreen circuitry. In addition, the electronic devices 180 may provide feedback information, such as visual, audible, and tactile alerts. It will be appreciated that the electronic devices 180 may be any one of a variety of computing devices and may include a processor and memory. For example, the electronic devices 180 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

In some instances, the controller 172 may be communicatively coupled to the sensor(s) 76 via a wired or wireless connection to allow data indicative of the oscillation conditions of the boom assembly 28 to be transmitted from the sensor(s) 76 to the controller 172. In response to receiving data, the controller 172 may be configured to provide information to the operator and/or automatically manipulate the first and second boom arms 32, 34 and/or a damping level of the boom assembly 28 based on one or more inputs received from the sensor(s) 76 of the work vehicle 10. In manually manipulated examples, the operator may vary the damping level of the boom assembly 28 by providing inputs to the controller 172, which in turn, actuates the damping assembly 126. In automatic or semi-automatic examples, based on the sensor data, the controller 172 may continuously or periodically determine or estimate the frequency and magnitude of oscillation of each boom arm 32, 34 relative to the ground surface 80 as the work vehicle 10 moves across a field. In such instances, if the controller 172 detects a change in the frequency and magnitude of oscillation of one or more of the boom arms 32, 34 that results in such boom arm(s) 32, 34 exceeding a threshold, the controller 172 may automatically initiate control of the operation of the damping assembly 126 to adjust the out-of-threshold boom arm(s) 32, 34 so as to maintain a desired levelness of the boom assembly 28 relative to the ground surface 80 across the width of the boom assembly 28 as the work vehicle 10 encounters varying surface profiles.

Additionally, in some embodiments, when performing a boundary application, the controller 172 may produce instructions for placing an unused boom arm 32, 34 in the folded position and for releveling the hydraulic suspension 112 based on the orientation of the boom assembly 28. In addition, the sensor 76 may provide visual data and/or geolocation data, which can also be used for determining whether a boom arm 32, 34 of the boom assembly 28 shall be placed in the folded position. In addition, in some instances, the sensor 76 may be configured as an accelerometer or other positioning device. In such instances, the controller 172 may relevel the boom assembly 28 as a levelness of the vehicle 10 is altered.

Figure 8:
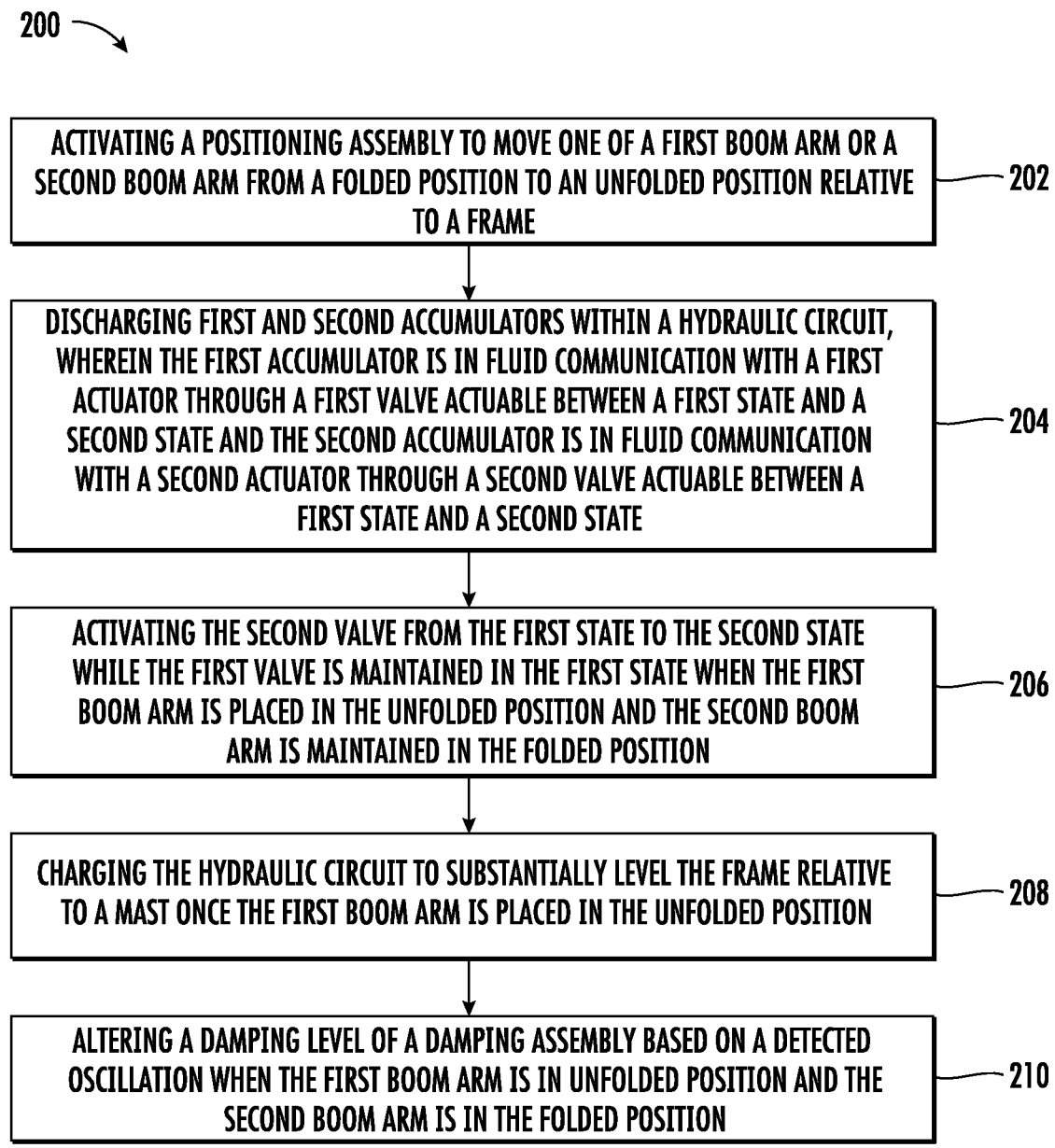
FIG. 8 illustrates a flow diagram of one embodiment of a method for operating a boom assembly of a work vehicle in accordance with aspects of the present subject matter.

Referring now to FIG. 8, a flow diagram of one embodiment of a method 200 for actuating a boom assembly 28 of a work vehicle 10 is illustrated in accordance with aspects of the present subject matter. In general, the method 200 will be described herein with reference to the work vehicle 10 and the hydraulic suspension 112 described above with reference to FIGS. 1-7. However, it should be appreciated by those of ordinary skill in the art that the disclosed method 200 may generally be implemented with any agricultural applicator machine/assembly having any suitable machine/assembly configuration and/or any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include activating a positioning assembly 48 to move one of a first boom arm 32 or a second boom arm 34 from a folded position to an unfolded position relative to a frame 30. For instance, as described above, the positioning assembly 48 may be capable of manipulating each of the first and second boom arms 32, 34 between a folded, inoperative position and an unfolded, operative position. Each of the boom arms 32, 34 may independently be positioned in either position irrespective of the position of the other boom arm 32, 34.

Additionally, at (204), the method 200 may include discharging first and second accumulators 122, 124 within a hydraulic circuit 118. As provided herein, the first accumulator 122 may be in fluid communication with a first actuator 114 through a first valve 128 that is actuatable between a first state and a second state and the second accumulator 124 may be in fluid communication with a second actuator 116 through a second valve 130 that is also actuatable between a first state and a second state. For instance, as indicated above, when either of the boom arms 32, 34 are moved from the folded position to the unfolded position, or vice versa, the hydraulic suspension 112 can discharge a pressure therein.

Moreover, at (206), the method may include activating the second valve 130 from the first state to the second state while the first valve 128 is maintained in the first state when the first boom arm 32 is placed in the unfolded position and the second boom arm 34 is maintained in the folded position. Next, at (208), the method may include charging the hydraulic circuit 118 to substantially level the frame 30 relative to a mast 36 once the first boom arm 32 is placed in the unfolded position.

While (206) and (208) of method (200) are described in reference to situations in which the first boom arm 32 is placed in the unfolded position and the second boom arm 34 is maintained in the folded position, it is understood that a similar method may occur at (206) and (208) and, rather than the method including activating the second valve 130 from the first state to the second state while the first valve 128 is maintained in the first state when the first boom arm 32 is placed in the unfolded position and the second boom arm 34 is maintained in the folded position, the method may include activating the first valve 128 from the first state to the second state while the second valve 130 is maintained in the first state when the second boom arm 34 is placed in the unfolded position and the first boom arm 32 is maintained in the folded position. Next, the method may include charging the hydraulic circuit 118 to substantially level the frame 30 relative to a mast 36 once the first boom arm 34 is placed in the unfolded position.

Lastly, at (210), the method includes altering a damping level of a damping assembly 126 based on a detected oscillation when the first boom arm 32 is in unfolded position and the second boom arm 34 is in the folded position. As provided herein, the damping level may be altered based on a user input or automatically by the controller 172. In various examples, the damping level may be altered at any point during operation of the work vehicle 10.

It is to be understood that the steps of the method 200 are performed by the controller 172 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media. Thus, any of the functionality performed by the controller 172 described herein, such as the method 200, is implemented in software code or instructions which are tangibly stored on a tangible computer readable medium. The controller 172 loads the software code or instructions via a direct interface with the computer readable medium or via a wired and/or wireless network. Upon loading and executing such software code or instructions by the controller 172, the controller 172 may perform any of the functionality of the controller 172 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler.

As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A boom assembly for an agricultural applicator, the boom assembly comprising:
    a mast configured to couple with a work vehicle;
    a frame supporting first and second boom arms extending from opposing side portions of the frame, each of the first and second boom arms configured to move between a folded position and an unfolded position;
    a hydraulic suspension operably coupled to the frame and to the mast and defining a hydraulic circuit having a hydraulic fluid therein the hydraulic suspension comprising:
        first and second actuators configured to mechanically interconnect the opposing side portions of the frame to the mast;
        a damping assembly positioned in fluid communication with the first and second actuators;
        a first valve actuatable between first and second states; and
        a second valve actuatable between first and second states; and
    a controller configured to control operation of the hydraulic suspension, wherein the controller comprises a processor and a memory, the controller is operatively coupled to the first and second valves, the controller is configured to control actuation of the first valve between the first state and the second state to alter fluid flow between the first actuator and the damping assembly, the controller is configured to position the first valve in the first state in response to the first boom arm being in the unfolded position, and the controller is configured to position the first valve in the second state in response to the first boom arm being in the folded position and the second boom arm being in the unfolded position.

2. The boom assembly of claim 1, wherein the damping assembly further includes a third valve configured to direct the hydraulic fluid through a first orifice defined by the damping assembly when the third valve is in a first state and through a second orifice defined by the damping assembly when the third valve is in a second state, the second orifice is parallel with the first orifice, and damping assembly is configured to provide a varied damping level based on whether the third valve is in the first state or the second state.

3. The boom assembly of claim 2, further comprising:
    a fourth valve within the damping assembly and fluidly positioned between the second valve and the first orifice defined by the damping assembly, wherein the fourth valve is actuatable between first and second states, and fluid flow through the damping assembly is substantially restricted when the fourth valve is in the second state to provide a generally rigid condition.

4. The boom assembly of claim 3, wherein the controller is operably coupled with the third and fourth valves, and the controller is configured to alter the damping level.

5. The boom assembly of claim 1, further comprising:
a relief valve configured reduce a pressure within the hydraulic suspension when the hydraulic suspension exceeds a threshold pressure.

6. The boom assembly of claim 1, further comprising:
a first accumulator in fluid communication with the first actuator;
a second accumulator in fluid communication with the second actuator; and
a charge/discharge circuit within the hydraulic suspension, wherein first and second accumulators are configured to recharge each time one or more of the first or second boom arms is moved from the folded position to the unfolded position.

7. The boom assembly of claim 6, wherein the first accumulator is fluidly coupled with a bore portion of the first actuator when the first valve is in the first state and with a rod portion of the first actuator when the first valve is in the second state.

8. The boom assembly of claim 1, wherein each of the first and second boom arms is operative in the unfolded position and inoperative in the folded position, and each of the first and second boom arms is configured to distribute an agricultural substance in the unfolded position.

9. The boom assembly of claim 1, wherein the hydraulic suspension is configured to damp rotary oscillations of the frame relative to the mast.

10. The boom assembly of claim 1, further comprising:
a positioning assembly operably coupled to the frame and to the first and second boom arms, wherein the positioning assembly is configured to independently move each of the first and second boom arms between the unfolded and folded positions.

11. The boom assembly of claim 1, wherein one of the first or second boom arms is in the unfolded position while the other of the first or second boom arms is in the folded position while applying an agricultural substance from one side of the boom assembly.

12. The boom assembly of claim 11, wherein one of the first or second boom arms is in the folded position while the other of the first or second boom arms is in the unfolded position while applying the agricultural substance to a border section of a ground surface.

13. The boom assembly of claim 1, wherein the controller is configured to control actuation of the second valve between the first state and the second state to alter fluid flow between the second actuator and the damping assembly, the controller is configured to position the second valve in the first state in response to the second boom arm being in the unfolded position, and the controller is configured to position the second valve in the second state in response to the second boom arm being in the folded position and the first boom arm being in the unfolded position.

14. A boom assembly for an agricultural applicator, the boom assembly comprising:

a mast configured to be coupled with a work vehicle;
a frame supporting first and second boom arms extending from opposing side portions of the frame;
a positioning assembly operably coupled to the frame and to the first and second boom arms, wherein the positioning assembly is configured to independently move each of the first and second boom arms between an unfolded position and a folded position;
a hydraulic suspension operably coupled to the frame and to the mast and defining a hydraulic circuit having a hydraulic fluid therein, the hydraulic suspension comprising:
first and second actuators configured to mechanically interconnect the opposing side portions of the frame to the mast;
a damping assembly positioned in fluid communication with the first and second actuators, wherein the damping assembly is configured to alter the hydraulic suspension between first and second damping levels; and
a first valve and a second valve each actuatable between first and second states; and
a controller configured to control operation of the hydraulic suspension, wherein the controller comprises a processor and a memory, the controller is operatively coupled to the first and second valves, the controller is configured to control actuation of the first valve between the first state and the second state to alter fluid flow between the first actuator and the damping assembly, the controller is configured to position the first valve in the first state in response to the positioning assembly moving the first boom arm to the unfolded position, and the controller is configured to position the first valve in the second state in response to the positioning assembly moving the first boom arm to the folded position and the second boom arm to the unfolded position.

15. The boom assembly of claim 14, further comprising:
a sensor positioned on the frame and configured to detect an oscillation of the boom assembly, wherein the damping assembly is configured to alter the hydraulic suspension from a first damping level to a second damping level to mitigate the oscillation detected by the sensor.

16. The boom assembly of claim 14, wherein the controller is configured to control actuation of the second valve between the first state and the second state to alter fluid flow between the second actuator and the damping assembly, the controller is configured to position the second valve in the first state in response to the positioning assembly moving the second boom arm to the unfolded position, and the controller is configured to position the second valve in the second state in response to the positioning assembly moving the second boom arm to the folded position and the first boom arm to the unfolded position.

17. The boom assembly of claim 14, further comprising:
a user-input device operably coupled with the controller and configured to accept a damping preference from a user.

* * * * *